(12) United States Patent
Daga et al.

(10) Patent No.: US 11,787,339 B2
(45) Date of Patent: Oct. 17, 2023

(54) TRAILER HITCHING ASSIST SYSTEM WITH TRAILER COUPLER DETECTION

(71) Applicant: Magna Electronics Inc., Auburn Hills, MI (US)

(72) Inventors: Shweta Suresh Daga, Maharashtra (IN); Jigneshkumar Natvarlal Vasoya, Gujarat (IN)

(73) Assignee: Magna Electronics Inc., Auburn Hills, MI (US)

( * ) Notice: Subject to any disclaimer, the term of this patent is extended or adjusted under 35 U.S.C. 154(b) by 569 days.

(21) Appl. No.: 16/947,386

(22) Filed: Jul. 30, 2020

(65) Prior Publication Data

US 2021/0034903 A1 Feb. 4, 2021

Related U.S. Application Data

(60) Provisional application No. 62/883,202, filed on Aug. 6, 2019, provisional application No. 62/880,194, filed on Jul. 30, 2019.

(51) Int. Cl.
| | |
|---|---|
| *G06V 10/22* | (2022.01) |
| *B60R 1/00* | (2022.01) |
| *G06V 10/44* | (2022.01) |
| *G06V 20/56* | (2022.01) |
| *G06F 18/214* | (2023.01) |
| *G06V 10/764* | (2022.01) |
| *G06V 10/774* | (2022.01) |

(52) U.S. Cl.
CPC ............ *B60R 1/00* (2013.01); *G06F 18/2148* (2023.01); *G06V 10/22* (2022.01); *G06V 10/44* (2022.01); *G06V 10/764* (2022.01); *G06V 10/7747* (2022.01); *G06V 20/56* (2022.01); *B60R 2300/10* (2013.01); *B60R 2300/20* (2013.01); *B60R 2300/808* (2013.01); *B60R 2300/8086* (2013.01)

(58) Field of Classification Search
CPC ......... G06V 10/44; G06V 10/22; G06V 20/56
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 6,498,620 | B2 | 12/2002 | Schofield et al. |
| 6,690,268 | B2 | 2/2004 | Schofield et al. |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |

(Continued)

*Primary Examiner* — Sam Bhattacharya
(74) *Attorney, Agent, or Firm* — HONIGMAN LLP

(57) ABSTRACT

A trailer assist system for a vehicle includes a camera disposed at a rear portion of a vehicle and having a field of view exterior and at least rearward of the vehicle, the field of view encompassing at least a portion of a trailer coupler of a trailer stationary a distance from the vehicle. The camera captures image data that is representative of at least the trailer coupler of the trailer. An ECU includes an image processor operable to process image data captured by the camera. The ECU, responsive to image processing at the ECU of image data captured by the camera, determines a location of the trailer coupler using a detector model, which is based on an ensemble regression tree algorithm.

15 Claims, 10 Drawing Sheets

(56) References Cited

U.S. PATENT DOCUMENTS

| | | |
|---|---|---|
| 9,085,261 B2 | 7/2015 | Lu et al. |
| 9,264,672 B2 | 2/2016 | Lynam |
| 9,446,713 B2 | 9/2016 | Lu et al. |
| 9,558,409 B2 | 1/2017 | Pliefke et al. |
| 10,071,687 B2 | 9/2018 | Ihlenburg et al. |
| 10,086,870 B2 | 10/2018 | Gieseke et al. |
| 10,099,614 B2 | 10/2018 | Diessner |
| 10,160,382 B2 | 12/2018 | Pliefke et al. |
| 10,532,698 B2 | 1/2020 | Potnis et al. |
| 10,552,976 B2 | 2/2020 | Diessner et al. |
| 10,586,119 B2 | 3/2020 | Pliefke et al. |
| 10,638,025 B2 | 4/2020 | Gali et al. |
| 10,706,291 B2 | 7/2020 | Diessner et al. |
| 10,733,757 B2 | 8/2020 | Gupta et al. |
| 10,755,110 B2 | 8/2020 | Bajpai |
| 11,417,116 B2 | 8/2022 | Joseph et al. |
| 2014/0063197 A1 | 3/2014 | Yamamoto et al. |
| 2014/0085472 A1 | 3/2014 | Lu et al. |
| 2014/0160276 A1 | 6/2014 | Pliefke et al. |
| 2014/0267688 A1 | 9/2014 | Aich et al. |
| 2015/0002670 A1 | 1/2015 | Bajpai |
| 2015/0215590 A1* | 7/2015 | Nowozin ............ H04N 9/69 348/242 |
| 2015/0217693 A1 | 8/2015 | Pliefke et al. |
| 2016/0049020 A1 | 2/2016 | Kuehnle et al. |
| 2017/0050672 A1 | 2/2017 | Gieseke et al. |
| 2017/0174128 A1 | 6/2017 | Hu et al. |
| 2017/0217372 A1 | 8/2017 | Lu et al. |
| 2017/0254873 A1 | 9/2017 | Koravadi |
| 2017/0280091 A1 | 9/2017 | Greenwood et al. |
| 2017/0341583 A1 | 11/2017 | Zhang et al. |
| 2018/0027187 A1* | 1/2018 | Seki ............ H04N 23/55 348/208.11 |
| 2018/0211528 A1 | 7/2018 | Seifert |
| 2018/0215382 A1 | 8/2018 | Gupta et al. |
| 2018/0253608 A1 | 9/2018 | Diessner et al. |
| 2018/0276838 A1 | 9/2018 | Gupta et al. |
| 2018/0276839 A1 | 9/2018 | Diessner et al. |
| 2019/0016264 A1 | 1/2019 | Potnis et al. |
| 2019/0039649 A1 | 2/2019 | Gieseke et al. |
| 2019/0042864 A1 | 2/2019 | Pliefke et al. |
| 2019/0064831 A1 | 2/2019 | Gali et al. |
| 2019/0118860 A1 | 4/2019 | Gali et al. |
| 2019/0143895 A1 | 5/2019 | Pliefke et al. |
| 2019/0241126 A1 | 8/2019 | Murad et al. |
| 2019/0275941 A1 | 9/2019 | Lu et al. |
| 2019/0297233 A1 | 9/2019 | Gali et al. |
| 2019/0329821 A1 | 10/2019 | Ziebart et al. |
| 2019/0347498 A1 | 11/2019 | Herman et al. |
| 2019/0347825 A1 | 11/2019 | Gupta et al. |
| 2020/0000552 A1* | 1/2020 | Mednikov ............ G16H 50/50 |
| 2020/0017143 A1 | 1/2020 | Gali |
| 2020/0238912 A1* | 7/2020 | Sakakibara ............ B60K 35/00 |
| 2020/0334475 A1 | 10/2020 | Joseph et al. |
| 2020/0356788 A1 | 11/2020 | Joseph et al. |
| 2020/0361397 A1 | 11/2020 | Joseph et al. |
| 2020/0406967 A1 | 12/2020 | Yunus et al. |
| 2021/0023997 A1 | 1/2021 | Vasoya |
| 2021/0034902 A1 | 2/2021 | Assa et al. |
| 2021/0078634 A1 | 3/2021 | Jalalmaab et al. |
| 2021/0094473 A1 | 4/2021 | Gali et al. |
| 2021/0170820 A1 | 6/2021 | Zhang |
| 2021/0170947 A1 | 6/2021 | Yunus et al. |
| 2021/0211825 A1* | 7/2021 | Joyner ............ H04S 7/301 |

* cited by examiner

| | Training Data | | | Detection Data | | |
|---|---|---|---|---|---|---|
| True positive | False positive | Accuracy (%) | | True positive | False positive | Accuracy (%) |
| 1547 | 23 | 98.53 | | 380 | 2 | 99.47 |

FIG. 6A

| Distance from camera (meter) | Average Error In Pixel | Average Error In mm |
|---|---|---|
| 3 | 2.62 | 161.00 |

FIG. 6B

| Total Videos | Correct detection count | False detection Count |
|---|---|---|
| 40 | 37 | 3 |

FIG. 6C

| No. | Scenario Detail |
|---|---|
| 1. | Trailer orientation ranging -60 to +60 degrees |
| 2. | Different environment condition like sunny, cloudy, rainy |
| 3. | Different Lighting conditions like Day, Night, shadow |

FIG. 6D

TRAILER HITCHING ASSIST SYSTEM WITH TRAILER COUPLER DETECTION

CROSS REFERENCE TO RELATED APPLICATIONS

The present application claims priority of U.S. provisional applications, Ser. No. 62/883,202, filed Aug. 6, 2019, and Ser. No. 62/880,194, filed Jul. 30, 2019, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Trailer assist systems are known that may determine an angle of a trailer hitched at a vehicle. Examples of such known systems are described in U.S. Pat. Nos. 9,085,261 and/or 6,690,268, which are hereby incorporated herein by reference in their entireties.

SUMMARY OF THE INVENTION

The present invention provides a driver assistance system or vision system or imaging system for a vehicle that utilizes a camera disposed at a rear portion of a vehicle and having a field of view exterior of the vehicle. When the vehicle is positioned near a trailer rearward of the vehicle, the field of view of the rearward viewing camera encompasses at least a portion of a trailer coupler of the trailer stationary at a distance from the vehicle. A control includes an image processor operable to process image data captured by the camera. The image data is representative of at least the trailer coupler of the trailer. The control, responsive to image processing at the control of image data captured by the camera, detects a location of the trailer coupler using a detector model. The detector model is based on an ensemble regression tree algorithm.

These and other objects, advantages, purposes and features of the present invention will become apparent upon review of the following specification in conjunction with the drawings.

BRIEF DESCRIPTION OF THE DRAWINGS

FIGS. 6A-D are tables of training and testing data of the system of FIG. 1;

DESCRIPTION OF THE PREFERRED EMBODIMENTS

A vehicle and trailer maneuvering system or maneuver assist system and/or driving assist system operates to capture images exterior of the vehicle and of a trailer being or to be towed by the vehicle and may process the captured image data to determine a path of travel for the vehicle and trailer or the vehicle toward the trailer and to detect objects at or near the vehicle and in the predicted path of the vehicle, such as to assist a driver of the vehicle in maneuvering the vehicle and trailer in a rearward direction or the vehicle toward the trailer, or to maneuver the vehicle and trailer in a rearward direction or the vehicle toward the trailer. The vision system includes an image processor or image processing system that is operable to receive image data from one or more imaging sensors (e.g., cameras) and that may provide an output to a display device for displaying images representative of the captured image data. Optionally, the vision system may provide a display, such as a rearview display or a top down or bird's eye or surround view display or the like.

Figure 1:
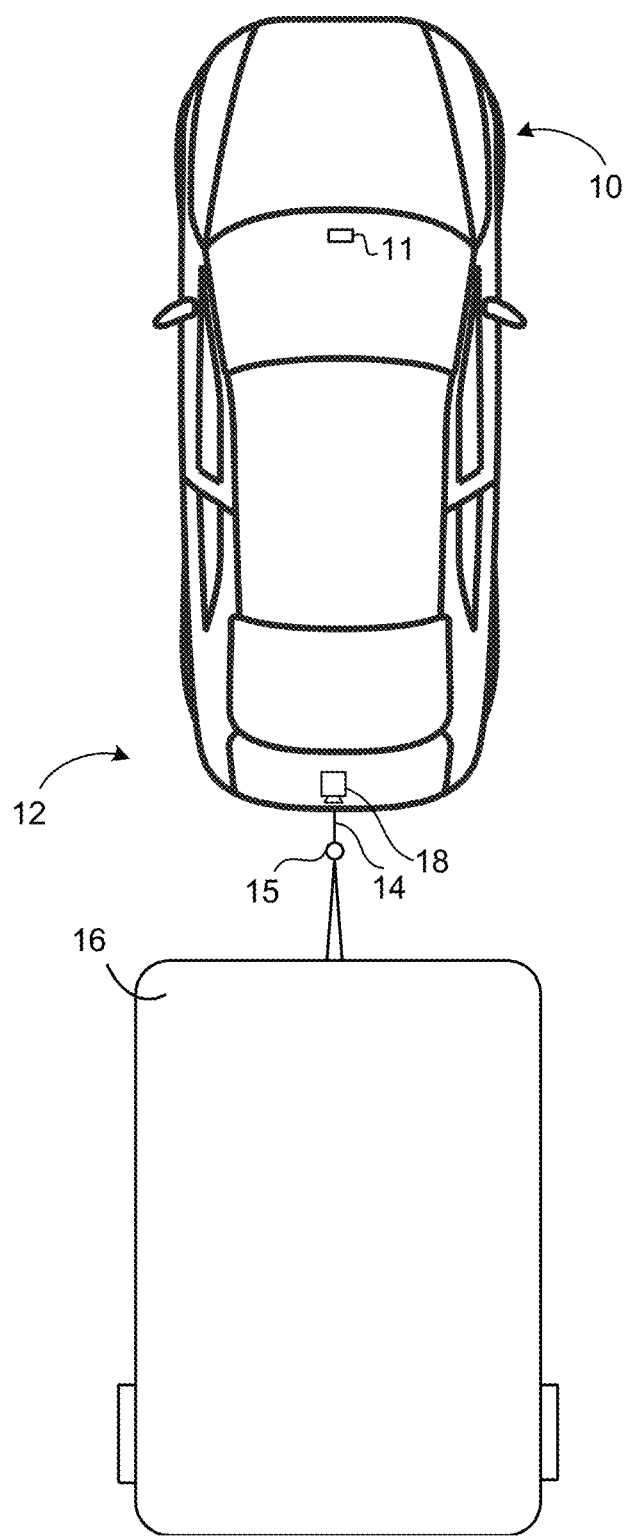
FIG. 1 is a plan view of a vehicle with a trailer assist system that is operable to steer a trailer along a trailer direction in accordance with the present invention.

Referring now to the drawings and the illustrative embodiments depicted therein, a vehicle 10 includes a vehicle and trailer maneuvering system or maneuver assist system and/or driving assist system 12 that is operable to assist in backing up or reversing the vehicle with a hitched trailer that is hitched at the rear of the vehicle via a hitch 14 or operable to assist in backing up or reversing the vehicle toward a trailer to be hitched, and the system may maneuver the vehicle 10 (and optionally the trailer 16) toward a desired or selected location. The trailer maneuver assist system 12 includes at least one exterior viewing vehicle-based imaging sensor or camera, such as a rearward viewing imaging sensor or camera 18 (and the system may optionally include multiple exterior viewing imaging sensors or cameras, such as a sideward/rearward viewing camera at respective sides of the vehicle), which captures image data representative of the scene exterior and rearward of the vehicle 10, with the field of view of the camera encompassing the hitch 14 and/or trailer 16 and/or trailer coupler 15, and with the camera 18 having a lens for focusing images at or onto an imaging array or imaging plane or imager of the camera (FIG. 1). Optionally, a forward viewing camera may be disposed at, for example, the windshield of the vehicle 10 and view through the windshield and forward of the vehicle 10, such as for a machine vision system (such as for traffic sign recognition, headlamp control, pedestrian detection, collision avoidance, lane marker detection and/or the like). The trailer maneuver assist system 12 includes a control 11 or electronic control unit (ECU) having a processor that is operable to process image data captured by the camera or cameras and that may detect objects or the like and/or provide displayed images (or other visual indication) at a display device for viewing by the driver of the vehicle (the control and/or display device may be part of or incorporated in or at an interior rearview mirror assembly of the vehicle, or the control and/or the display device may be disposed elsewhere at or in the vehicle) a representation of the captured image data. The data transfer or signal communication from the imaging sensor 18 (e.g., camera) to the ECU may comprise any suitable data or communication link, (wired or wireless), such as a vehicle network bus or the like of the equipped vehicle.

With advanced driver-assistance or driving-assistance systems (ADAS), Trailer Hitch Assist (THA) features assist a driver of a vehicle with maneuvering (i.e., reversing) the vehicle towards the trailer coupler 15 of a trailer without the need for manual steering, acceleration, or brake input by the driver. The system may automatically align the vehicle with the trailer so that the trailer coupler 15 of the trailer only needs to be lowered onto the hitch 14 (i.e., a hitch ball of the hitch of the vehicle).

The towing vehicle generally couples with the trailer via a coupler 15 and a hitch ball 14. The hitch ball 14 is the attachment point for the vehicle's hitch and allows the towing vehicle to get to the exact location required for attachment. Therefore, it is advantageous for a trailer hitch assist system to detect the coupler 15 position so that it may accurately assist in maneuvering the vehicle to the detected trailer 16 and coupler 15.

The system of the present invention determines a position of the coupler 15 while the trailer is multiple meters (e.g., approximately 3-4 meters) from the towing vehicle. The system processes image data captured by the rearward viewing imaging sensor or camera disposed at the towing vehicle to detect the coupler ball position of the trailer based on an "ensemble regression tree" algorithm, or any other similar or suitable algorithm. This system detects or determines one or more outline landmarks representative of portions of a coupler region. The system detects or determines the coupler 15 position as one of the landmark points from the coupler region in a variety of different trailer orientations and with a variety of road types and lighting conditions.

Figure 2:
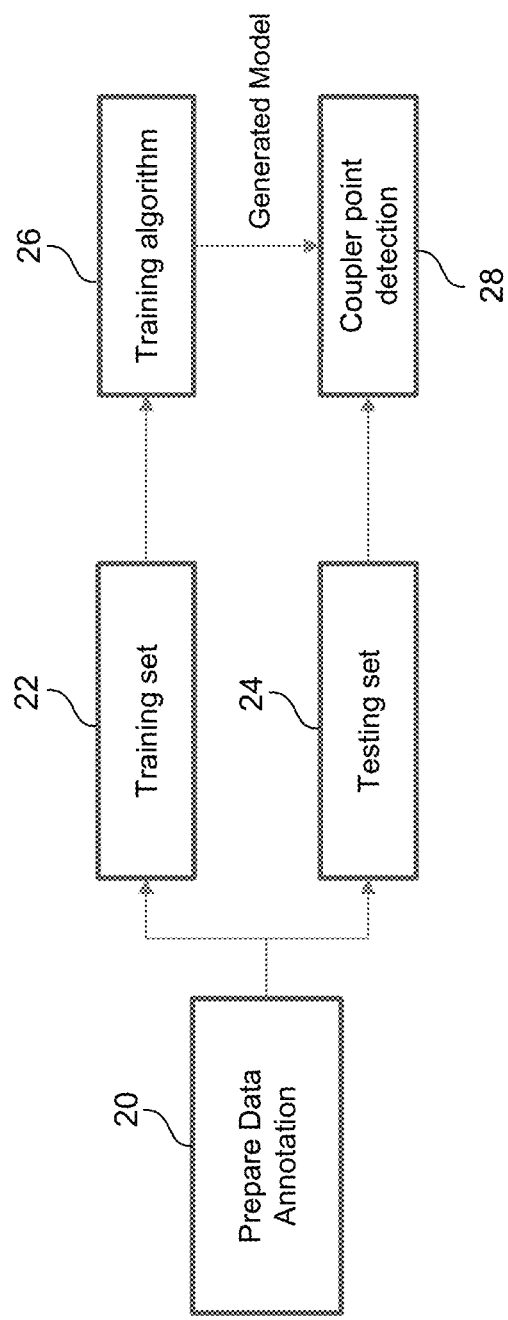
FIG. 2 is a block diagram of the trailer assist system of FIG. 1.
Figure 3B:
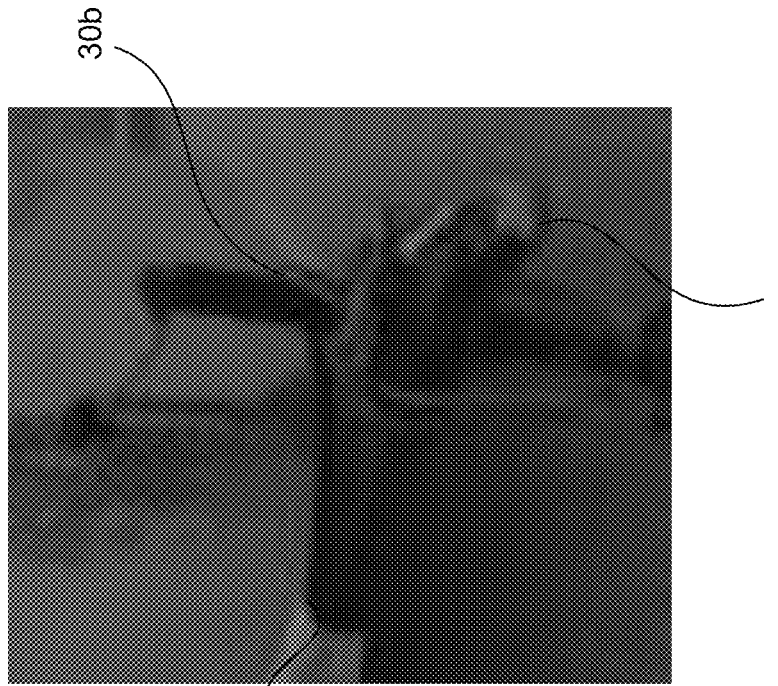
FIGS. 3A and 3B are perspective views of a hitch with landmark points in accordance with the present invention.
Figure 3A:
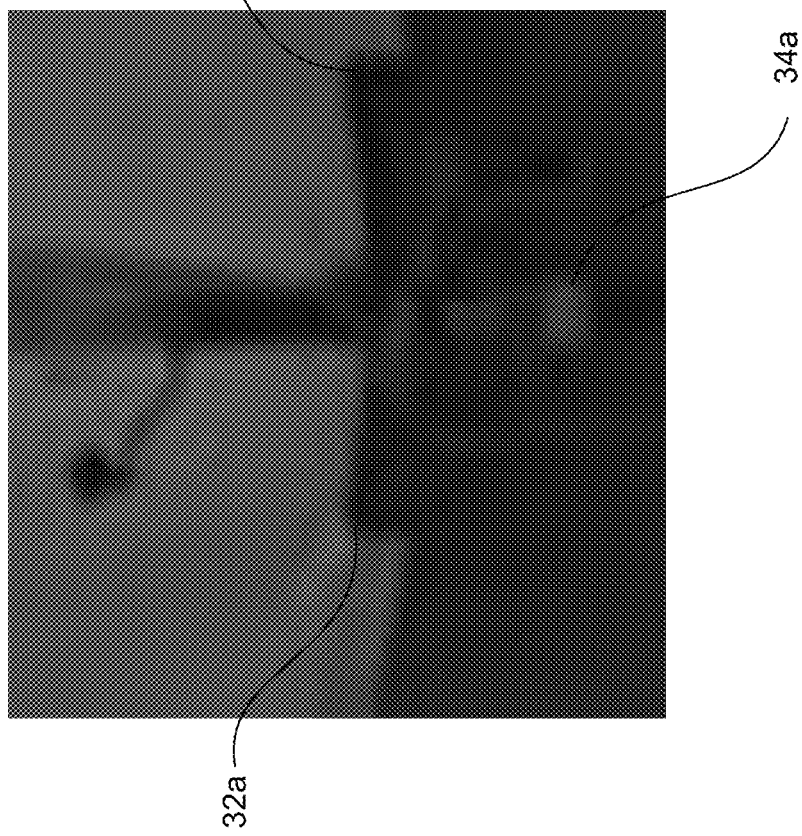

Referring now to FIG. 2, the system, at 20, creates annotation data by annotating landmark points in each image of a data set (e.g., a set of image data captured by the rear viewing camera that include the trailer and trailer coupler point). For example, each landmark point or coupler landmark or outline landmark may be labeled with an x-coordinate and a y-coordinate pixel position. In the first step, the landmark points may be chosen or selected or detected from the coupler region which may determine the shape of the coupler 15. In some implementations, one of the landmark points is the coupler point itself. In some examples, three landmark points may be selected. FIGS. 3A and 3B provide two example input images of coupler regions. One of the landmark points selected from such input images may be a right corner 30*a*, 30*b* of the coupler region. Another one of the landmark points may be a left corner 32*a*, 32*b* of the coupler region. Another landmark point, as previously mentioned, may be the coupler point 34*a*, 34*b*. Thus, in some examples, the system considers three landmark points (e.g., the right corner, the left corner, and the coupler point), however more or less landmark points may be used depending on the particular application of the trailer hitching assist system.

In the second step, the system divides the annotated data into a training set at 22 and a testing set at 24. That is, a portion of the annotated data becomes training data and a separate portion of the annotated data becomes testing data. For example, the system, using the training set, may train cascades of regression trees using the ensemble method at 26. In the third step, the system tunes the parameters of the cascading regression trees based on the training and testing data error determined during training to generate a detection model for detecting the coupler point of the trailer. The generated model detects landmark points on the testing set of data at 28 to validate the accuracy of the generated model. In some examples, intensity values are used as features of the generated model.

Figure 4:
FIG. 4 is a perspective view of an image captured by a camera of the system of FIG. 1.
Figure 5B:
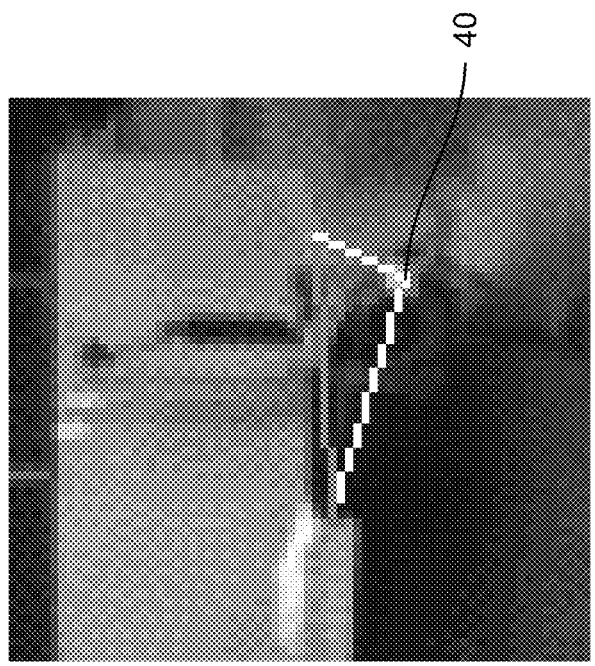
FIGS. 5A and 5B are perspective views of an input image and an output image of the system of FIG. 1 in accordance with the present invention.
Figure 5A:
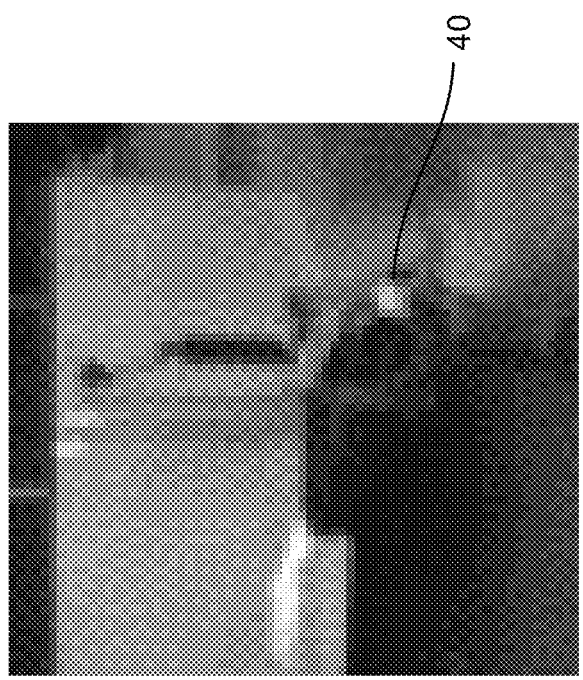
Figure 7A:
FIGS. 7A-F are perspective views of a trailer in different orientations with respect to the camera of the vehicle of FIG. 1.
Figure 7B:
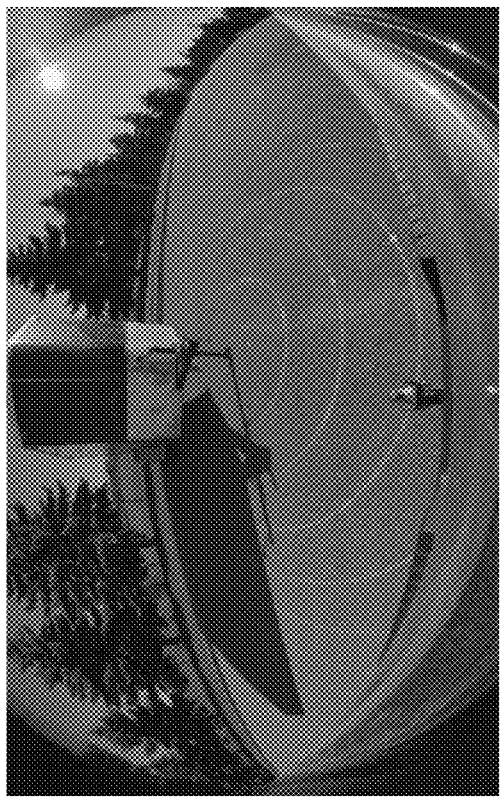
Figure 7C:
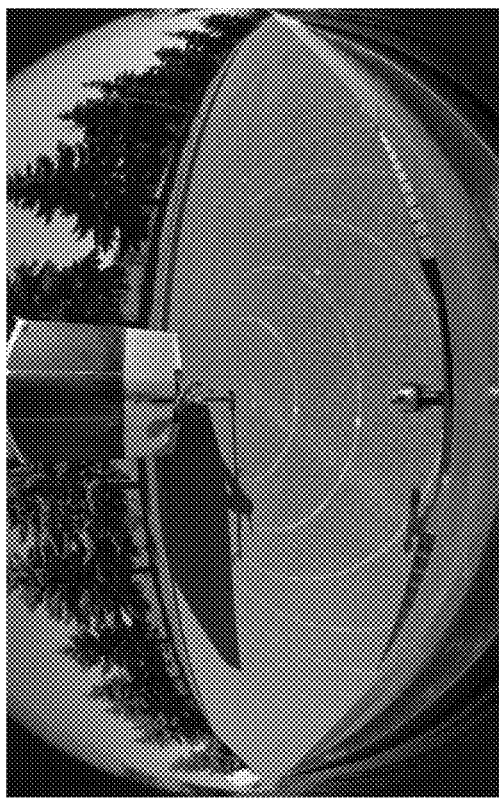
Figure 7D:
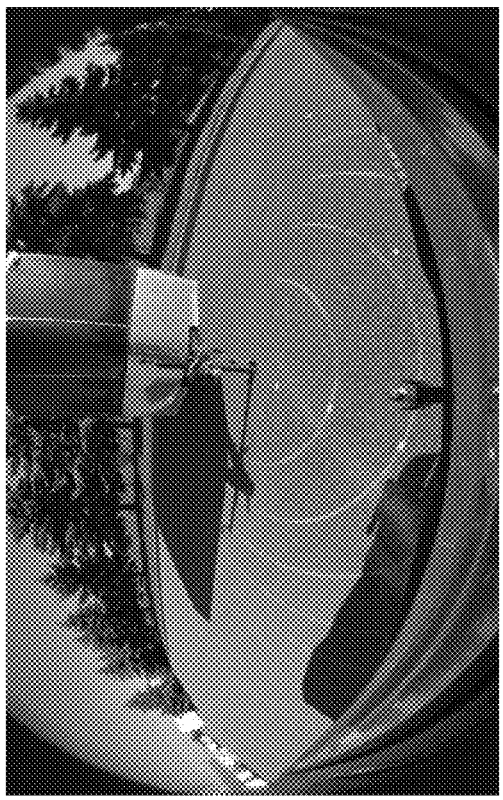
Figure 7F:
Figure 7E:
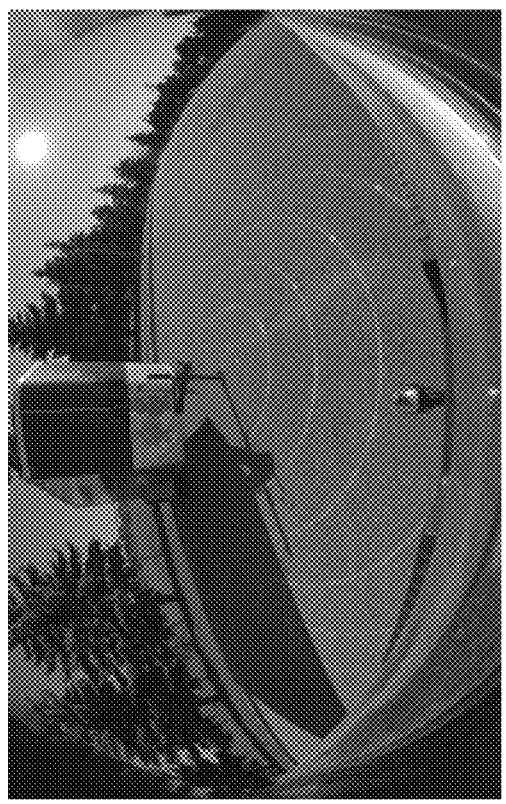
Figure 8A:
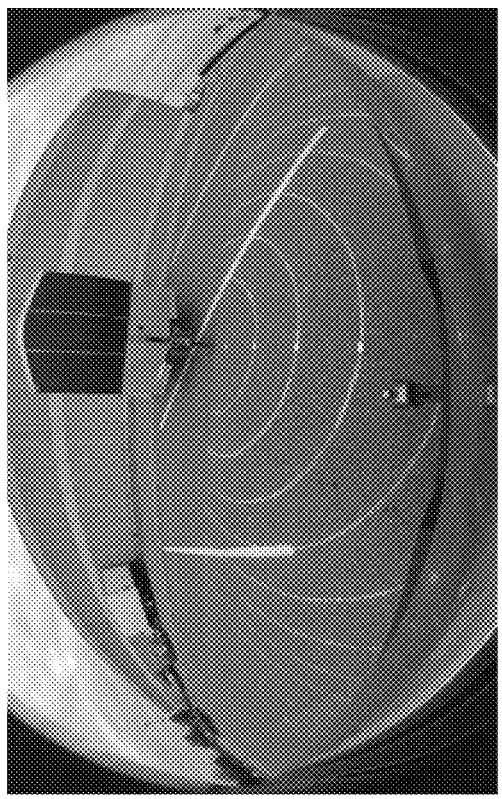
FIGS. 8A-F are perspective views of a trailer in different lighting and background conditions in accordance with the present invention.
Figure 8B:
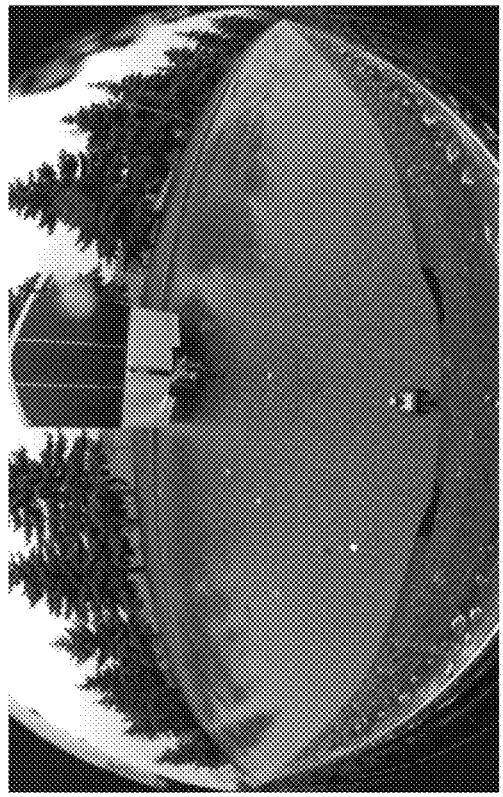
Figure 8C:
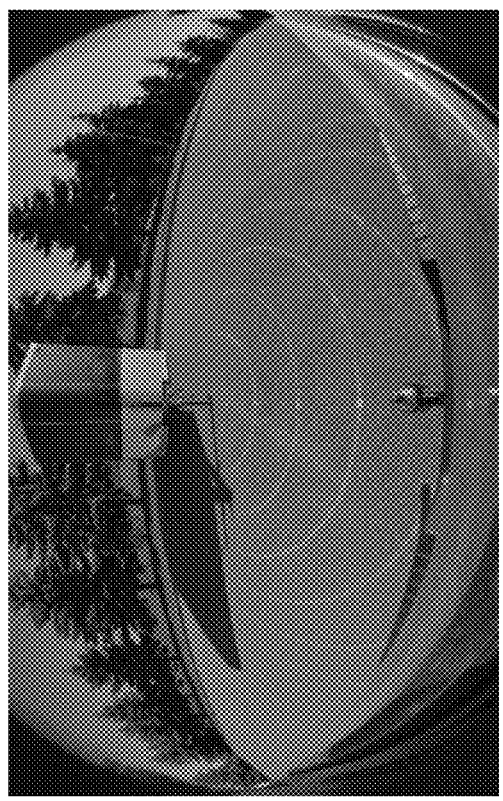
Figure 8D:
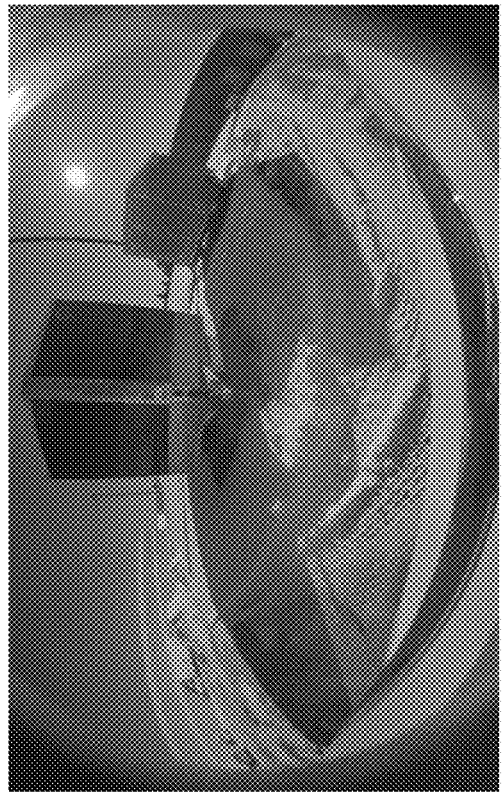
Figure 8F:
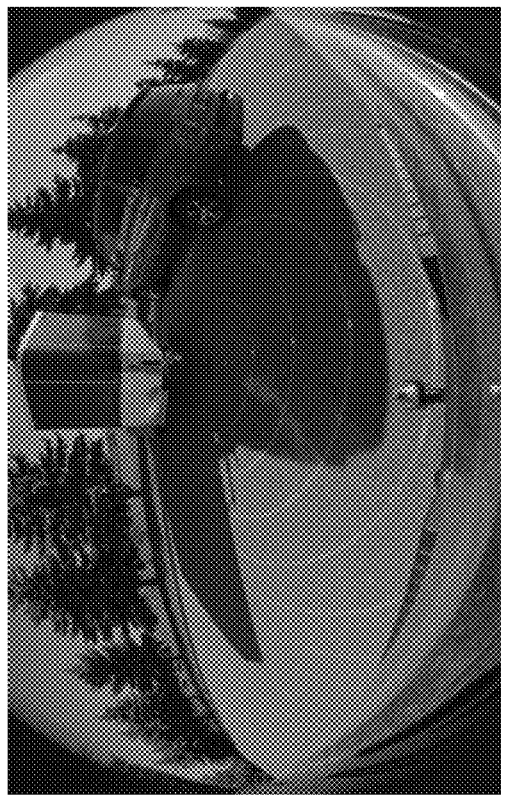
Figure 8E:
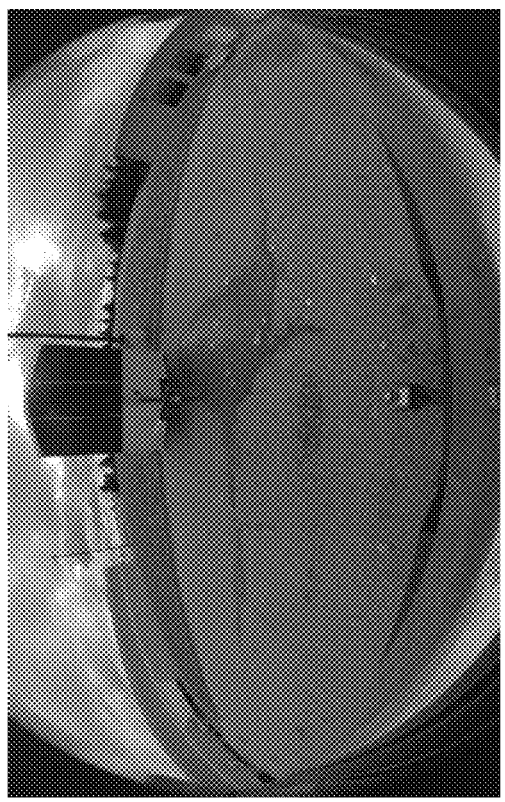

Referring now to FIG. 4, the rear viewing camera 18 may capture an image that includes the coupler point 40. As shown in FIG. 5A, in some examples, the system may receive a portion of the captured camera image (e.g., the coupler region) to reduce processing. The system may identify the coupler region by using one or more classifiers. For example, the captured image data may be split into one or more sections or patches and the control may process or evaluate the patches one at a time and determine if a the coupler region is present in the patch. The control may sweep or process each patch at multiple different scales (i.e., upscaled and downscaled image data). In some implementations, the system uses a two-stage classifier. For example, the first stage of the classifier may include a linear Support Vector Machine (SVM) that filters out the majority (e.g., 99 percent) of negative patches (i.e., patches that do not include the coupler region). The SVM is efficient and quickly processes the patches, which allows the control to quickly sweep the entire frame of captured image data.

The system passes any patches that are not negative (i.e., the SVM determined the coupler region may be present) to a second stage of the classifier. In some examples, the second stage includes a nonlinear SVM. The nonlinear SVM accurately filters out the patches that the linear SVM designated as potentially including the coupler region (i.e., false positives). Due to the increased processing time of the nonlinear SVM, limiting processing to only the patches passed by the linear SVM substantially reduces overall processing time and increases the efficiency of the system. The nonlinear SVM (i.e., the trailer detection stage) may output a bounding box that highlights the location of the coupler region in the frame of captured image data. The system, using the partial image or bounding box, may generate an output image with marked landmark points (FIG. 5B). For example, the landmark points may be the right corner, left corner, and coupler point as previously discussed.

Thus, optionally, the system processes the image in two steps, with a first step that is less-computationally intensive to eliminate areas that the system determines with a high degree of confidence do not include the trailer coupler. Then, during a second step, the system may apply different or more thorough processing or more computationally intensive processing to the remaining areas, thus reducing the amount of resources needed to process the entire frame of image data.

In some implementations, the coupler point detection is performed for a number of consecutive frames (e.g., five frames) to increase the accuracy of the coupler point determination. In some implementations, an unsupervised learning method (e.g., mixture models, K-Means, etc.) is used to generate a single point as the coupler's location in the camera image. However, other types of learning may also be used (e.g., reinforcement learning, supervised learning, etc.). Known algorithms may be practiced to determine the three dimensional location (i.e., x-coordinates, y-coordinates, and z-coordinates) of the coupler in camera/vehicle frame (e.g., Structure from Motion). The system may include a variety of sensors to determine the z-coordinate (e.g., a two-dimensional or three-dimensional imaging sensor or a distance sensor or the like).

FIGS. 6A-6D provides a measure of the performance of the system. For example, using a training data size of 1570 samples and a testing data size of 382, the system recorded a 98.53% accuracy over the training data and 99.47% accuracy over the detection data (FIG. 6A). When the rear viewing camera is approximately three meters from the coupler point, the system recorded an average error of 2.62 in pixels and an average error of 161 in mm (FIG. 6B). When provided with 40 videos, the system correctly detected the coupling point in 37 videos (FIG. 6C). The system was tested with a trailer orientation ranging from plus and minus 60 degrees from the center of the vehicle's hitch, different environment conditions (e.g., sunny, cloudy, rainy), and in different lighting conditions (e.g., day, night, shadow) to ensure the accuracy and robustness of the system (FIG. 6D). FIGS. 7A-7F illustrate trailer in different orientations with respect to the vehicle (e.g., from −60 to +60 degrees). Similarly, FIGS. 8A-8F illustrate the system detecting the coupler point of the trail in different lighting and background conditions.

Thus, aspects of the present invention provide a system that generates a coupler point detector model that is trained on trailer image data annotated with landmarks that indicate the shape of the coupler. The model is trained based on an ensemble regression tree algorithm, or any other appropriate algorithm and/or method, and is capable of accurately and robustly detecting the coupler point of a trailer in a variety of different orientations, road types, and lighting conditions. The system may also be used for trailer angle estimation.

The system may utilize aspects of the trailering assist systems or trailer angle detection systems or trailer hitch assist systems described in U.S. Pat. Nos. 10,638,025; 9,085,261 and/or 6,690,268, and/or U.S. Publication Nos. US-2020-0017143; US-2019-0347825; US-2019-0275941; US-2019-0118860; US-2019-0064831; US-2019-0042864; US-2019-0039649; US-2019-0143895; US-2019-0016264; US-2018-0276839; US-2018-0276838; US-2018-0253608; US-2018-0215382; US-2017-0254873; US-2017-0050672; US-2015-0217693; US-2014-0160276; US-2014-0085472 and/or US-2015-0002670, and/or U.S. patent application Ser. No. 16/947,379, filed on Jul. 30, 2020, Ser. No. 16/946,542, filed on Jun. 26, 2020, Ser. No. 15/929,535, filed on May 8, 2020, and/or Ser. No. 16/850,300, filed on Apr. 16, 2020, and/or U.S. provisional application 62/880,194, filed on Jul. 30, 2019, which are all hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044;

4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailering assist system, the trailer assist system comprising:
   a camera disposed at a rear portion of a vehicle equipped with the vehicular trailering assist system, the camera having a field of view at least rearward of the vehicle, the camera viewing at least a portion of a trailer coupler of a trailer that is spaced from the vehicle at a distance from the vehicle;
   an electronic control unit (ECU) comprising electronic circuitry and associated software;
   wherein the electronic circuitry comprises an image processor operable to process image data captured by the camera
   wherein the ECU, responsive to image processing at the control of image data captured by the camera, determines a location of the trailer coupler using a detector model, and wherein the detector model is based on an ensemble regression tree algorithm; and
   wherein the detector model is trained on annotated image data, the annotated image data comprising outline landmarks representative of portions of the trailer coupler, and wherein the outline landmarks represent at least one selected from the group consisting of (i) a left corner of the trailer coupler, (ii) a right corner of the trailer coupler, and (iii) a coupling point of the trailer coupler.

2. The vehicular trailering assist system of claim 1, wherein the ECU, based on the outline landmarks, determines at least part of a shape of the trailer coupler.

3. The vehicular trailering assist system of claim 1, wherein the outline landmarks represent each of (i) the left corner of the trailer coupler, (ii) the right corner of the trailer coupler, and (iii) the coupling point of the trailer coupler.

4. The vehicular trailering assist system of claim 1, wherein the detector model is trained on a cascade of at least one regression tree.

5. The vehicular trailering assist system of claim 4, wherein the at least one regression tree comprises a feature of intensity values.

6. The vehicular trailering assist system of claim 1, wherein, responsive to detecting the location of the trailer coupler, the ECU performs a reversing maneuver of the vehicle towards the determined trailer coupler location.

7. The vehicular trailering assist system of claim 1, wherein the ECU, responsive to determining the location of the trailer coupler, displays the location of the trailer coupler on a display device disposed within the interior of the vehicle.

8. The vehicular trailering assist system of claim 1, wherein the ECU determines the location of the trailer coupler of the trailer using a two-stage classifier.

9. The vehicular trailering assist system of claim 1, wherein the ECU repeats determination of the location of the trailer coupler via processing at the ECU of consecutive frames of image data captured by the camera.

10. A vehicular trailering assist system, the trailer assist system comprising:
    a camera disposed at a rear portion of a vehicle equipped with the vehicular trailering assist system, the camera having a field of view at least rearward of the vehicle, the camera viewing at least a portion of a trailer coupler of a trailer that is spaced from the vehicle at a distance from the vehicle;
    an electronic control unit (ECU) comprising electronic circuitry and associated software;
    wherein the electronic circuitry comprises an image processor operable to process image data captured by the camera;
    wherein the ECU, responsive to image processing at the control of image data captured by the camera, determines a plurality of outline landmarks representative of portions of the trailer coupler of the trailer, and wherein the plurality of outline landmarks represent at least one selected from the group consisting of (i) a left corner of the trailer coupler, (ii) a right corner of the trailer coupler, and (iii) a coupling point of the trailer coupler;
    wherein the ECU, based on the plurality of outline landmarks, determines at least part of a shape of the trailer coupler; and
    wherein the ECU, responsive to determining at least the shape of the trailer coupler, determines a location of the trailer coupler using a detector model.

11. The vehicular trailering assist system of claim 10, wherein the detector model is trained on annotated image data, the annotated image data comprising the outline landmarks representative of portions of the trailer coupler.

12. The vehicular trailering assist system of claim 10, wherein the outline landmarks represent each of (i) the left corner of the trailer coupler, (ii) the right corner of the trailer coupler, and (iii) the coupling point of the trailer coupler.

13. The vehicular trailering assist system of claim 10, wherein the ECU determines the location of the trailer coupler of the trailer using a two-stage classifier.

14. The vehicular trailering assist system of claim 10, wherein the ECU repeats determination of the location of the trailer coupler via processing at the ECU of consecutive frames of image data captured by the camera.

15. A vehicular trailering assist system, the trailer assist system comprising:
    a camera disposed at a rear portion of a vehicle equipped with the vehicular trailering assist system, the camera having a field of view at least rearward of the vehicle, the camera viewing at least a portion of a trailer coupler of a trailer that is spaced from the vehicle at a distance from the vehicle;
    an electronic control unit (ECU) comprising electronic circuitry and associated software;
    wherein the electronic circuitry comprises an image processor operable to process image data captured by the camera;
    wherein the ECU, responsive to image processing at the control of image data captured by the camera, determines a plurality of outline landmarks representative of portions of the trailer coupler of the trailer, and wherein the outline landmarks represent at least one selected from the group consisting of (i) a left corner of the trailer coupler, (ii) a right corner of the trailer coupler, and (iii) a coupling point of the trailer coupler;
    wherein the ECU, based on the plurality of outline landmarks, determines a shape of the trailer coupler;

wherein the ECU, responsive to determining the shape of the trailer coupler, determines a location of the trailer coupler using a detector model, and wherein the detector model is based on an ensemble regression tree algorithm; and wherein, responsive to detecting the location of the trailer coupler, the ECU performs a reversing maneuver of the vehicle towards the determined trailer coupler location.

\* \* \* \* \*